Patented Feb. 23, 1932

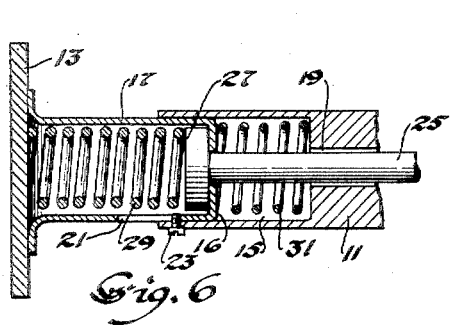
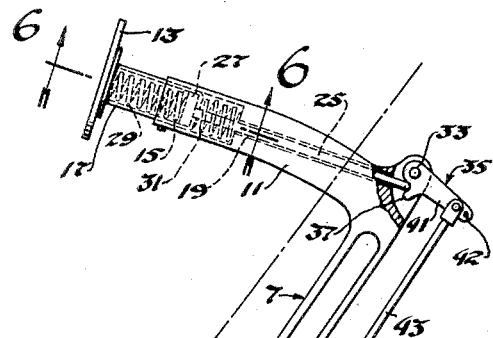
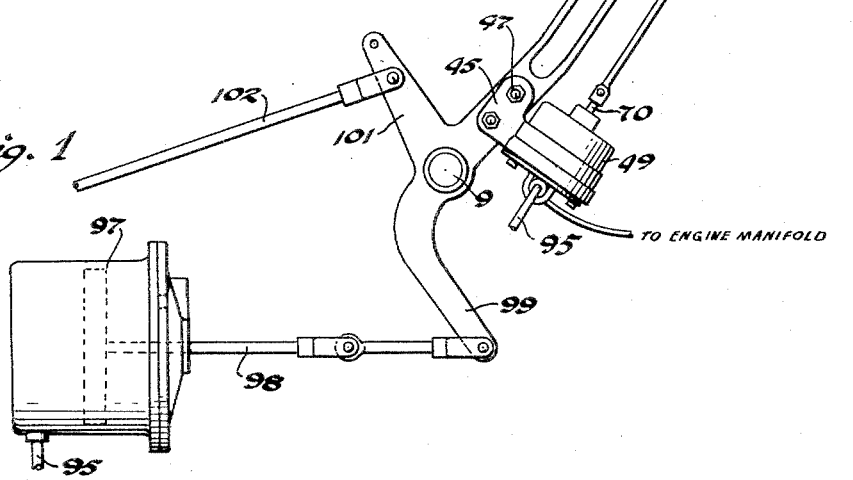
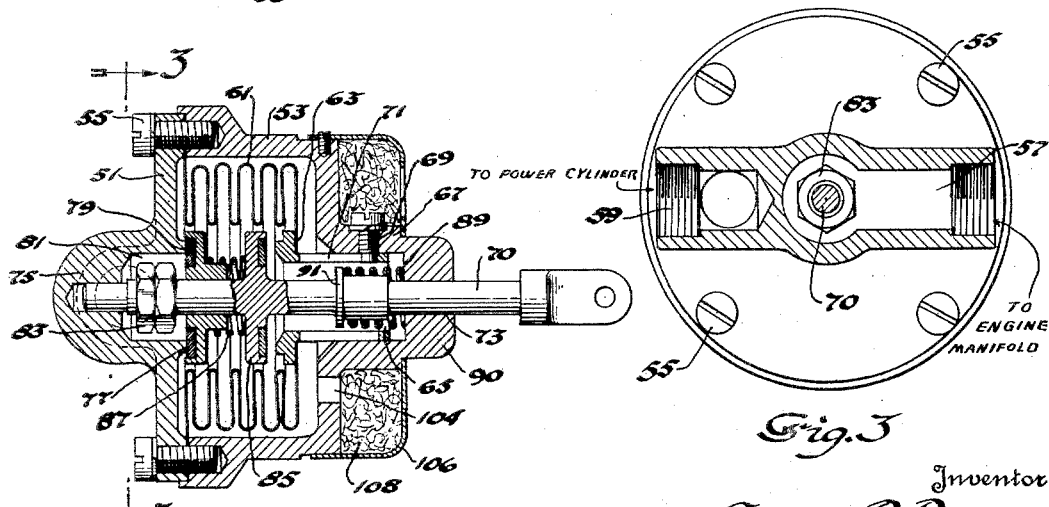

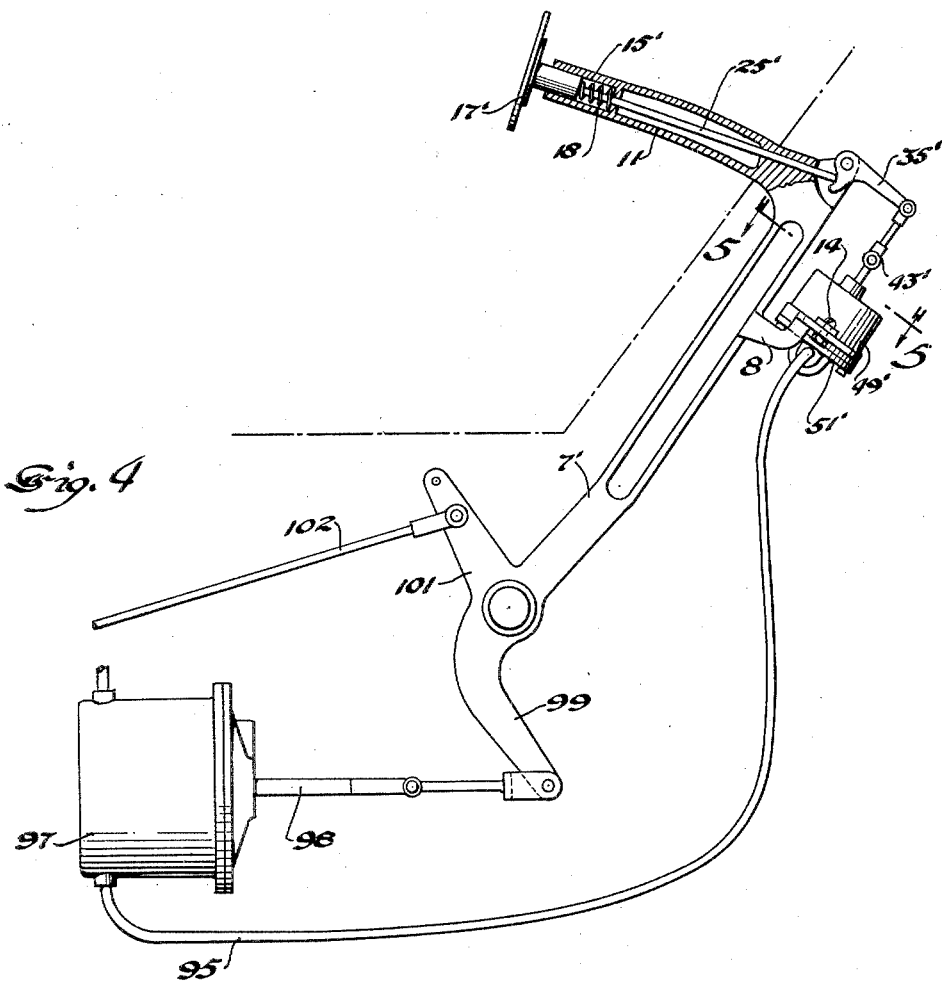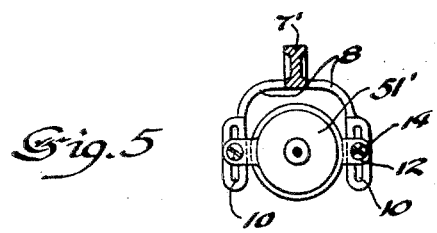

1,846,081

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

POWER BRAKE MECHANISM

Application filed March 1, 1928. Serial No. 258,293.

This invention relates to brake operating mechanism and has been designed particularly as an improvement in the operating mechanism for a combined mechanical and fluid pressure brake for motor vehicles.

In known systems of this kind, it has been proposed to supplement the manual effort of the operator by fluid pressure rendered effective to apply the brake by means of a valve controlling the pressure condition, the valve containing movable parts actuated by the pedal or lever used by the operator in applying the brake mechanically.

An object of this invention is a simplified arrangement of these known parts. As another object, the simplification is attained without the sacrifice of certain characteristics of earlier types, such as the division of the applied effort, and the reaction on the pedal of the added supplementary pressure. As another and important object, the invention contemplates the mounting of the control valve on the pedal, thereby avoiding all the connecting parts between the pedal and valve such as are commonly used when the valve is otherwise located. Other objects and advantages will be understood from a reading of the following full description and from an examination of the accompanying drawings.

In the drawings:

Figure 1 is an elevation of my improved brake operating mechanism as applied to a vehicle;

Figure 2 is a section through a preferred form of valve;

Figure 3 is a view of the valve in end elevation, the view being partly in section and on line 3—3 of Figure 2;

Figure 4 is an elevation of a modified form; and

Figure 5 is a section on line 5—5 of Figure 4.

Figure 6 is a section on line 6—6 of Figure 1.

Referring by reference characters to the drawings, first to Figures 1 to 3 inclusive, numeral 7 represents a pedal pivotally located on the vehicle as is the usual brake pedal of a motor vehicle. Numeral 9 represents the lever fulcrum which may be in any convenient position beneath the floor boards. The pedal has an upper arm 11 extending through the floor board where it is provided at its extremity with a foot pad 13. The foot pad is movably related to the pedal proper instead of being fixed to the pedal, as is customary. To provide a guided movement, the end of the pedal has a recess 15 receiving a tubular stem portion 17 projecting from the pedal pad 13, the stem 17 slidably guided in the recess 15. The stem 17 may be slotted as at 21 and a set screw 23 carried by the end of the pedal may enter the slot and be positioned to at times engage the inner end thereof. By this means, rotation of the pad relative to the pedal is prevented and its outward movement is limited. The angular arm 11 is further longitudinally apertured as at 19 for slidably mounting a reciprocating rod 25 having a head 27 within the recess 15 and also within the in-turned end 16 of the tubular stem 17 of the pad. Between head 27 and the pedal pad 13 and located with the hollow stem is a relatively heavy compression coil spring 29. Between the in-turned end of the tubular stem 17 and the bottom of the recess 15 is a light coil spring 31.

Pivoted to the angle portion of the pedal beneath the floor board as at 33 is a bell crank lever 35 having a short arm 37 extending lengthwise of the arm 39 of the pedal 7, which arm lies beneath the floor board. This arm 37 is engaged by the lower end of rod 25. The other arm of bell crank, arm 41, has a plurality of apertures represented by numeral 42 for adjustably connecting to the bell crank one end of a rod 43 parallel to arm 39. To the lower end of arm 39 near the fulcrum of the pedal is a bracket 45 secured by fastening means 47. To this bracket is secured a fluid pressure control valve designated as an entirety by numeral 49 and more particularly shown in Figure 2. This valve contains movable parts which are actuated by the operator through the instrumentality of the pedal pad in its movements relative to the pedal. The inward movement of the pedal pad as it compresses spring 31 moves the head 27 of rod 25 through the agency of spring 29. This movement of head 27 and rod 25 rotates the bell crank and through the bell crank withdraws rod 43 from the valve 49.

The valve is composed of a head portion 51 and a valve body 53, the body and the head being secured together by suitable fastening means 55. The head 51 has two openings 57 and 59, as best shown in Figure 3. The opening 57 extends to the middle of the head and the opening 59 extends only part way toward the middle. Secured to the head as by being clamped thereto by fastening means 55 is a sylphon bellows 61. The other end of the bellows carries a movable valve seat 63. The valve seat may have a hollow stem 65 slidable in a reduced part 67 of the valve body 53. A set screw 69 in a slot 71 may serve to limit the movement of the movable valve seat. Valve rod 70 is guided in an opening 73 in the reduced outer end of member 53 and in a recess 75 in part 51. The head 51 is formed with a valve seat 77 engaged by a valve 79, the valve 79 being slidably mounted on the rod 70. Within a recess 81, which is at the inner end of opening 57, in the head 51 are nuts 83 to at times engage valve 79 and raise said valve from its seat 77, this action being effected by an outward reciprocating movement of rod 70. As will be seen from Figure 1, the rod 70 is terminally connected with rod 43. Rigid with or secured to rod 70 is a valve 85 positioned to engage at times the movable seat 63 carried by the bellows. This engagement is made when rod 70 is moved outwardly and to the right, as shown in Figure 2. A coil spring 87 encircles rod 70 and is in abutment with valve 85 and operates to push valve 79 against its seat 77. A coil spring 89 also encircles rod 70 and is located between an abutment 91 rigid with the rod and the inner reduced end 90 of the valve member 53. From Figures 2 and 3, it will be seen that opening 57 communicates with the bellows through the valve 79, when open, and that opening 59 is at all times in communication with the interior of the bellows. A conduit 95 connects the opening 59 with a power operating cylinder 97 on that side of the piston in the cylinder remote from a rod 98, which connects the piston of the cylinder with an arm 99 formed preferably as an integral part of the pedal 7. Another pedal arm 101 is for connection to a brake or the brakes through any preferred sort of hook-up by means of a rod 102. With reference again to the valve it should be noted that the body member 53 is provided with one or more openings 104 and that a cover member 106 is positioned over the end having the openings 104. Between the part 53 and the cover member there may be an air cleaning material 108, such as coarse hair.

The source of power is preferably the suction obtainable from the internal combustion engine of the vehicle and is rendered available by the opening of the suction valve member 79 of the valve 49. Such opening causes the motor suction to withdraw air from that side of the piston in cylinder 97 remote from the connecting rod 98. The air on the reverse side, being at atmospheric pressure, is therefore effective to push the piston toward the left as in Figure 1, and rotate the pedal clockwise and apply the brake by means of the rod 102.

The operation may be further described and it is substantially as follows: As pressure is applied to the pedal pad, this pressure is transmitted through spring 29, head 27, rod 25, bell crank 35 and rod 43 to the valve 49. The rod 70 is thus pulled outwardly, valve 85 engages its seat 63 and a continued movement of rod 70 expands the bellows and opens suction valve 79. The motor suction then operates through the valve upon the power cylinder, as previously described. A part of the pedal pressure is used in so operating the auxiliary power mechanism. The other part of the pedal pressure is positively actuating the brake through movement of the pedal. The division of power is dependent upon, or measured by the extent to which spring 31 is compressed. Any yielding of spring 31 permits the pad to move relatively to the pedal and to push the rod 25 and cause the suction brake to operate. The pedal pressure is, therefore, divided, one part applying the manual effort directly and the other part operating the suction valve. In some earlier forms, when the equivalent of valve 49 was located elsewhere than on the pedal and connected to the pedal by operating linkage, the rotation of the pedal by the fluid pressure means caused the pedal movement to react on the valve and tended to hold the suction valve member open. That construction also interfered with the proper release of the suction brake, and it was found advisable to so arrange the linkage between the power cylinder and the brake that it should not operate through the manually operable pedal. By locating the valve member rigidly with the pedal, such a reaction upon the valve is avoided. The valve is, however, a true reaction valve as will be readily appreciated. As the suction increases in the cylinder, it also builds up in the valve bellows. The valve chamber outside the bellows is open to the air and the air tends to collapse the bellows and close the suction valve 79. This action is, of course, resisted by the tension of rod 70. The pull upon rod 70 caused by the unbalanced condition within the valve reacts through rod 43, bell crank 35 and rod 25 upon the pedal pad. This reaction does not necessarily lift the pad as the rod moves owing to the presence of spring 29. The spring 29 gives evidence to the operator as it becomes compressed of the extent of supplementary force being exerted by the suction brake.

It will be understood that the arms of the bell crank may be varied to produce a desired leverage effect. The length of rod 43 as shown is such as to accommodate a position of the valve 49 well down beneath the floor board and toward the fulcrum of the pedal. It will be of course understood that the valve may be located in any convenient position along the pedal, its changed position being sometimes required by obstacles carried by the vehicle chassis. In some installations, it may be found best to locate the valve upwardly near the angle of the pedal, and in Figure 4 is shown a form of the invention wherein this position has been adopted.

Referring now to Figures 4 and 5, the pedal is represented by reference character 7' and the power cylinder as 97. Numeral 98 represents a rod connecting the power cylinder with an arm 99 on the pedal as before, and the pedal also has an arm 101 connected by rod 102 with the brakes, as in the previous form. In this form of the invention, the valve is substantially the same as the valve 49 and is represented by reference character 49'. Its plunger rod 70 is connected in this case by a short rod 43'. This short rod is operated by bell crank 35' corresponding in every way with the bell crank of the form first described. The rod 25' extends through the outward arm of the pedal as before. In this case, the rod 25 is directly connected with the pedal pad 17' which is guided in a recess 15' in the upper end of arm 11. Between the lower end of the pedal pad and an abutment in arm 11 is a coil spring 18. In this form of the invention, a somewhat different form of valve mounting is shown. The pedal 7' is formed with laterally disposed arms 8, these arms being provided with slots 10. The valve head 51' corresponding to valve head 51 of the other form has lateral arms 12 and fastening means 14 adjustably secure the valve head 51' to the arms 8. The plurality of apertures 42 in the bell crank cooperate to accommodate the positions of adjustment of the valve on the bracket arms. The rigid connection between the pedal pad and the rod 25' causes the reaction effect of the valve to positively move the pedal pad and thus give the operator the measure of intensity of the auxiliary brake, this positive movement taking the place of the movement of the compression spring 29 in the other form. This arrangement is not regarded as so desirable as that of the form shown in Figure 1, but it is simpler and may in some installations be found preferable.

In each of the two forms, the reaction of the valve on the pedal itself makes possible the actuation of the brake by the power cylinder through the pedal as a part of the linkage without causing a further opening of the suction valve, as was the case in the form of constructions referred to above. In each of the two forms shown, the suction valve is opened by a part of the pressure applied to the pedal, the remaining portion of pedal pressure functioning through a direct mechanical connection with the brakes. In each of the two forms, the "feel" of the auxiliary force is present since the valve is a true reaction valve. In one form, that shown in Figures 4 and 5, the reaction is through positive connections directly to the pedal pad. In the other form, that shown in Figures 1 to 3, the reaction serves to compress spring 29 without the actual movement of the pedal pad. Both forms provide for leverage adjustment.

I claim:

1. In combination, a brake operating lever, a pedal pad slidable relatively to said lever, a power cylinder, a control valve therefor carried by said lever, said valve also adapted to react on said pedal pad, a connection between said pad and said control valve, whereby the valve reacts upon said pedal pad with a predetermined mechanical advantage, said connection including a bell crank pivoted to said lever, an operable connection between said valve and one arm of said bell crank and a second operable connection between said pad and another arm of said bell crank.

2. In combination, a brake operating lever, a pedal pad movable relative to said lever, a power cylinder, a control valve therefor carried by said lever, said valve also adapted to react on said pedal pad, a movement multiplying means, connections therefrom to said pedal pad and to said valve whereby the valve reacts upon said pedal pad with a predetermined mechanical advantage.

In testimony whereof I affix my signature.

GEORGE P. BERRY.